United States Patent [19]

Priepke et al.

[11] 4,324,324

[45] Apr. 13, 1982

[54] APPARATUS FOR DECLUTCHING A GEAR SELECTOR

[75] Inventors: Edward H. Priepke, Stevens; Wayne B. Martenas, New Holland, both of Pa.

[73] Assignee: Sperry Corporation, New Holland, Pa.

[21] Appl. No.: 192,786

[22] Filed: Oct. 1, 1980

[51] Int. Cl.³ .................... F16D 43/00; G05G 17/00; A01D 69/08
[52] U.S. Cl. ......................................... 192/101; 74/2; 74/100 R; 56/10.2; 180/271; 192/89 QT; 192/93 R; 192/137
[58] Field of Search .................. 192/89 QT, 101, 137, 192/93 R; 56/10.2, DIG. 15; 180/271, 274, 285; 74/100 R, 2

[56] References Cited
U.S. PATENT DOCUMENTS

| 2,411,543 | 11/1946 | Kann ............................. 192/101 X |
| 2,533,392 | 12/1950 | Nelson .................................. 74/100 |
| 2,541,515 | 2/1951 | Hoffman et al. .................... 192/101 |
| 3,896,608 | 7/1975 | Garrott ............................. 56/10.2 |
| 3,959,953 | 6/1976 | Garrott ............................. 56/10.2 |

OTHER PUBLICATIONS

Service Manual, Sperry New Holland Forage Harvesters, Electronic Metal Detector-1978, pp. 29-30.

Primary Examiner—Allan D. Herrmann
Attorney, Agent, or Firm—James R. Bell; Frank A. Seemar

[57] ABSTRACT

Agricultural vehicles, such as a forage harvester, have been equipped with metal detectors. The metal detecting device is connected to stop the feed roll mechanism in a fraction of a second. In connection with this, it is important to shift the associated feed roll drive from a forward mode to a neutral mode. Such shifting, if done manually, may involve a delay sufficient to permit the harvester head to jam with crop material. Jamming is avoided by apparatus for automatically declutching a gear selector thus almost instantaneously shifting to the desired neutral mode in response to actuation of the metal detecting device.

7 Claims, 3 Drawing Figures

APPARATUS FOR DECLUTCHING A GEAR SELECTOR

BACKGROUND OF THE INVENTION

This invention relates generally to harvesters and more particularly to those having condition responsive operation.

When a metal object enters the throat area of a forage harvesting machine equipped with a metal detector, the drive to the feed rolls must be stopped rapidly. In connection with stopping the feed rolls, the feed roll drive mechanism must somehow be shifted from its forward running position to neutral, which then allows a header drive and associated slip clutch drive to the feed rolls to stop. If the drive is not stopped, a slip clutch in the drive mechanism would slip excessively and the header would jam with material.

An electric motor has been coupled with a gear train and a limit switch for stopping the feed roll drive mechanism. This arrangement is limited in that it causes a delay of two or three seconds which is sufficient to permit the aforementioned slippage and resultant jamming.

The foregoing illustrates limitations of the known prior art. Thus, it is apparent that it would be advantageous to provide an alternative directed to overcoming one or more of the limitations as set forth above.

SUMMARY OF THE INVENTION

In one aspect of the present invention, this is accomplished by providing an apparatus for declutching a gear selector including a member operably connected for moving the gear selector between a forward and a neutral position. Links are interconnected for pivoting to move the member between the forward and neutral positions. A resilient member is connected to the links for maintaining the member in the forward position and for moving the links to urge the member to the neutral position.

The foregoing and other aspects will become apparent from the following detailed description of the invention when considered in conjunction with the accompanying drawings. It is to be expressly understood, however that the drawings are not intended as a definition of the invention but are for the purpose of illustration only.

DESCRIPTION OF THE PREFERRED EMBODIMENT

Figure 1:
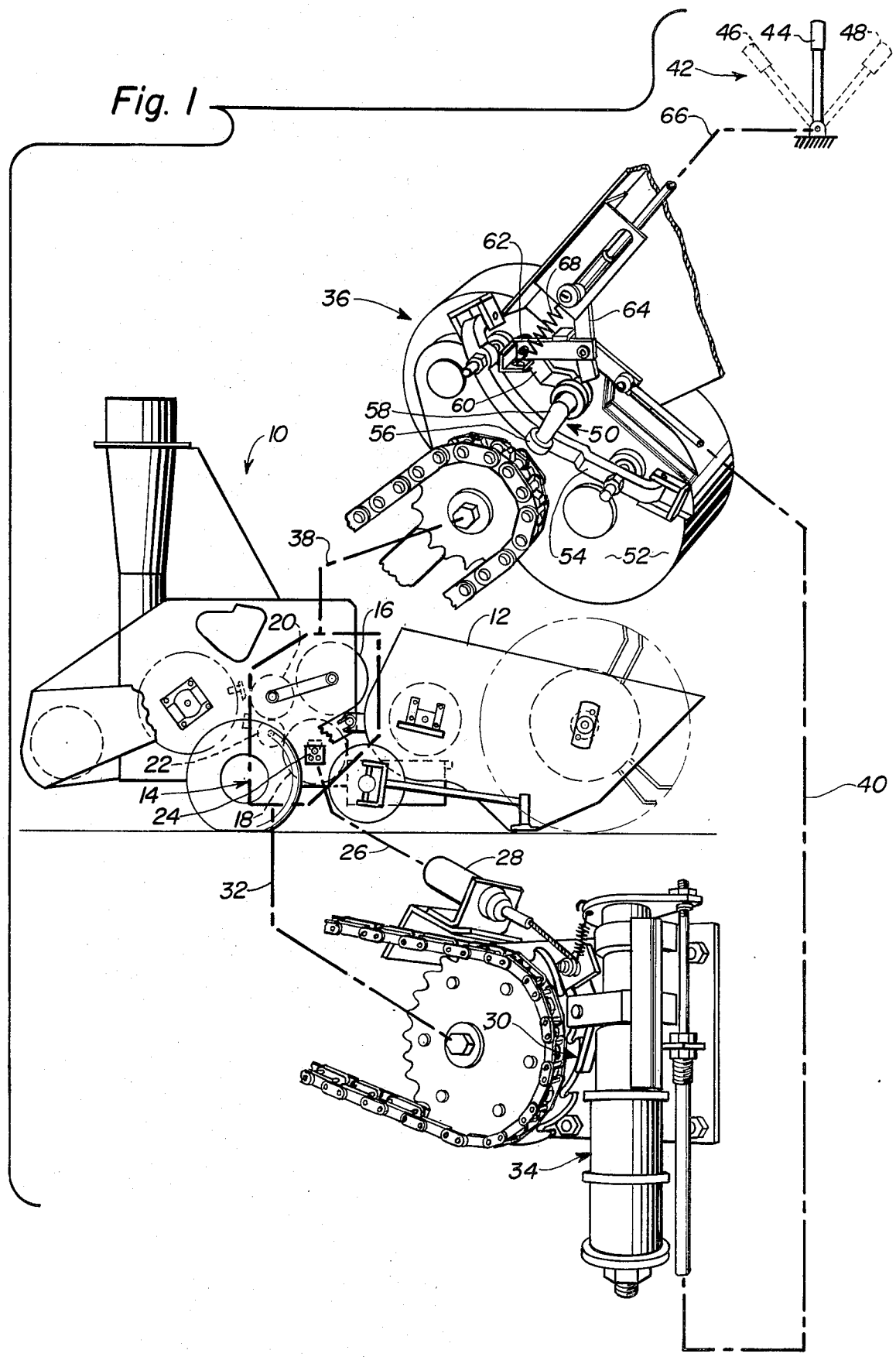
FIG. 1 is a broken view including partial isometric inserts illustrating an embodiment of the declutching apparatus of this invention connected to the feed roll mechanism of a forage harvester having a metal detector, connected to a damped apparatus for quick-stopping rotating members and connected to a hand control lever for moving a gear selector.

In FIG. 1, an agricultural vehicle such as a forage harvester 10 includes a crop attachment 12. A feed roll mechanism 14 on the harvester generally includes a forward pair of upper and lower feed rolls 16,18, respectively and a rearward pair of upper and lower feed rolls 20,22, respectively. A metal detector 24 is in forward lower feed roll 18 and is connected via conventional means 26 to actuate a solenoid 28 operably connected to a ratchet and pawl device 30 for stopping the conventional drive 32 to feed rolls 16,18,20,22 in a fraction of a second when metal is detected in the vicinity of the feed rolls 16,18,20,22, as is well known. More recently, a damped, quick-stopping device 34 has improved the previously known ratchet and pawl device 30.

The present invention is directed to apparatus designated 36 for declutching a gear selector. Apparatus 36 is operably connected via conventional means 38 to drive feed rolls 16,18,20,22. Also apparatus 36 is operably connected via conventional means, such as a control cable to damped quick-stopping device 34. Further, apparatus 36 is operably connected to a manually operated lever 42 having an exemplary solid line neutral position 44 and exemplary broken line forward and reverse positions 46, 48 respectively.

Apparatus 36 generally comprises a gear selector tripping mechanism and is associated with a conventional gear selector cam device 50 including gearbox 52 having a detented ramp 54 and a roller 56 actuatable for compressing or releasing discs in a clutch pack (not shown) inside gearbox 52. Cam device 50 is connected via an arm 58 to means such as a gear selector arm 60 for moving gear selector 50 between a forward and a neutral position. Arm 60 also moves to other positions, such as reverse, which is not discussed herein in detail. A pair of interconnected first and second links 62,64, respectively, are connected to arm 60. Previously mentioned conventional means such as a known cable actuating device 40 is connected for moving links 62,64. Resilient means such as a tension spring 68 is connected to the links. Another cable 66, similar to cable 40, interconnects second link 64 and lever 42.

Figure 3:
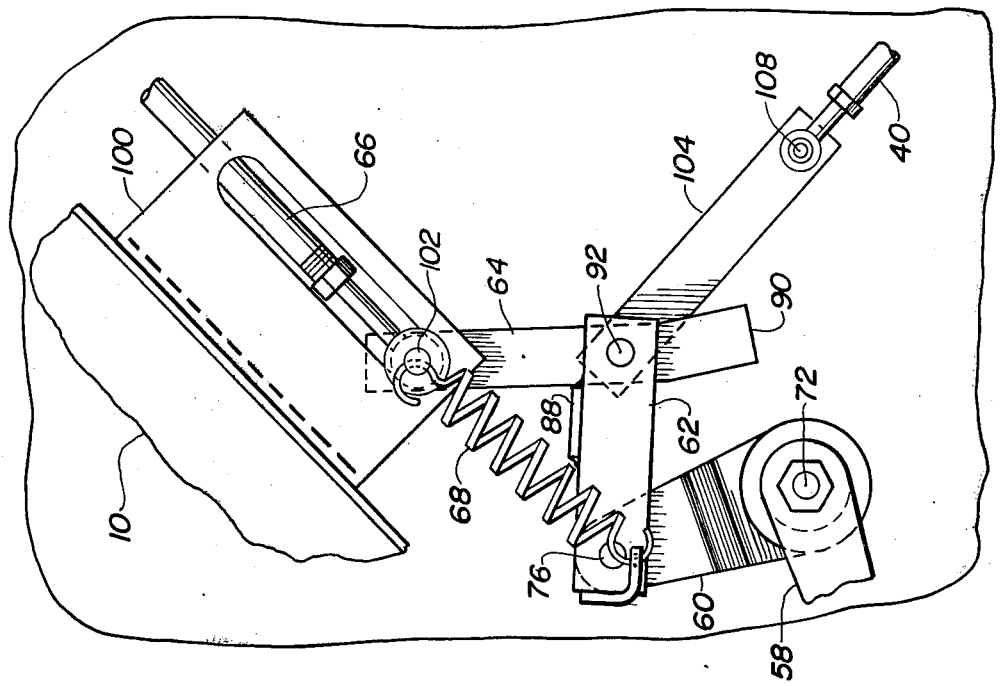
FIG. 3 is a diagrammatic view illustrating the declutching apparatus of this invention in the neutral mode.
Figure 2:
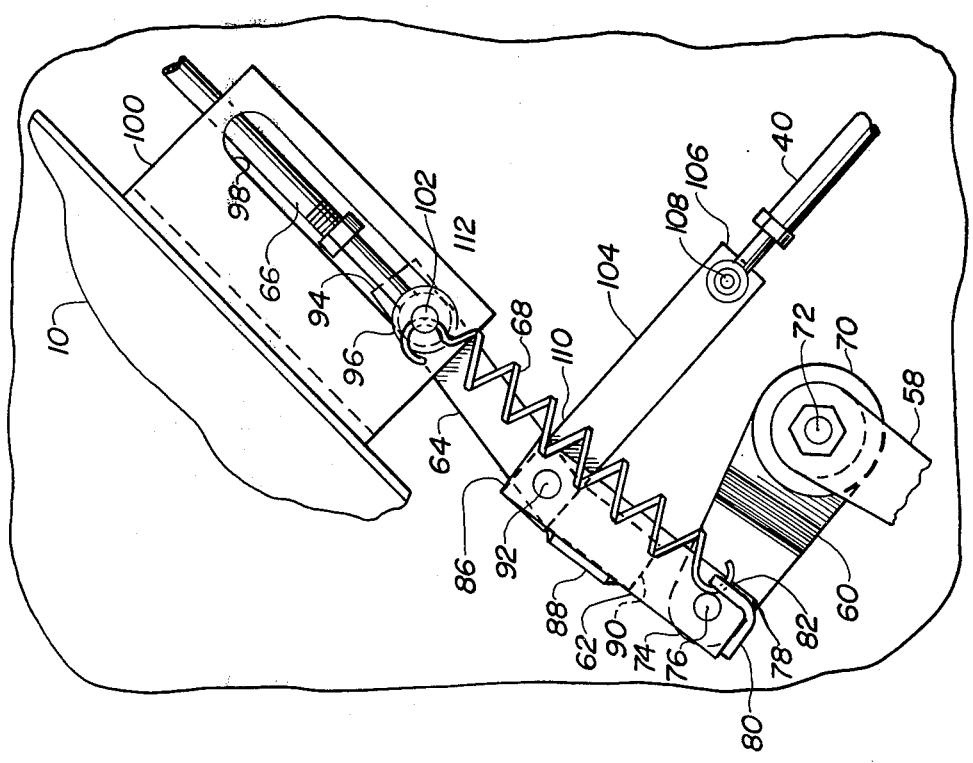
FIG. 2 is a diagrammatic view illustrating the declutching apparatus of this invention in the forward mode.

FIGS. 2 and 3 provide a diagrammatic illustration of apparatus 36 shown in a "cocked" position in FIG. 2 and in a "tripped" position in FIG. 3. In FIG. 2, arm 60, formed of a piece of cast iron, has a first end 70 pivoting about point 72, and a second end 74 pivotally attached at 76 to first link 62. Link 62, also formed of a piece of steel flat stock, has a first end 78 having a steel retainer 80 preferably welded thereon. Retainer 80 has an aperture 82 formed therein on one side of pivot point 76. Link 62 has a second end 86 having a steel stop 86 welded thereon and protruding therefrom.

Second link 64 is also formed of a piece of steel flat stock having a first end 90 pivotally connected to first link 62 at pivot point 92 in such a manner that first end 90 rotates into and out of engagement with stop 88. A second end 94 of link 64 includes a slide 96 slidably mounted in a guide slot 98 formed in a portion 100 of the frame of vehicle 10. Slide 96 is pivotally connected at 102 to control cable 66.

Means, such as a cable arm 104, also formed of steel flat stock, has a first end 106 pivotally connected to control cable 40 at 108 and a second end 110 pivotally connected at 92 to first and second links 62,64, respectively, for moving links 62,64 between a first position, FIG. 2, wherein stop 88 engages first end 90 of second link 64 and gear selector 50 is in a forward mode, and a second position, FIG. 3, wherein stop 88 is out of engagement with first end 90 of second link 64 and gear selector 50 is in a neutral mode.

Steel tension spring 68 is connected at one end 84 to aperture 82 of retainer 80 and connected at another end 112 to slide 96 for maintaining links 62,64 in the first position (FIG. 2) and for urging links 62,64 into the second position (FIG. 3).

With the parts assembled as set forth above, it can be seen that when a metal object enters the vicinity of the feed roll mechanism 14, the object is detected by metal detector 24 and an appropriate signal is sent to solenoid 28. Thus, ratchet and pawl device 30 is actuated and cable 40 simultaneously actuates declutching apparatus 36 such that arm 104 moves links 62,64 to the tripped position of FIG. 3. In response, cam 56 moves on detented ramp 54 in the known manner for shifting a clutch pack (not shown) in gearbox 52 to the neutral mode. This occurs because arm 104 pulls pivot point 92 below the imaginary center line of spring 68 and the spring load on pivot 76 rotates arm 60 to the neutral mode. Slide 96 remains stationary due to the limitations of guide slot 98.

The declutching apparatus 36 is reset from an operator's station by moving control lever 42 attached to control cable 66. As a result, pivot 102 and slide 96 move in guide slot 98 until pivot points 102,92 and 76 are substantially in a straight line. Then, because spring 68 is connected to retainer 80 to one side, i.e., slightly below as viewed in FIGS. 2 and 3, of pivot 76, pivot 92 is rotated above the centerline of spring 68 into a stable position wherein end 90 of link 64 engages stop 88.

With spring 68 attached at pivot 102 and at aperture 82 below pivot point 76, pivot 92 is maintained above the centerline of spring 68 causing an "overcenter" situation thus maintaining apparatus 36 in the "cocked" position of FIG. 3. In this position, apparatus 36 functions as a solid link so that movements of lever 42 will manually shift gearbox 52 to a desired gear selection in the usual manner.

The foregoing has described a gear selector tripping mechanism for automatically declutching a gearbox in response to actuation of an electronic metal detector.

It is anticipated that aspects of the present invention, other than those specifically defined in the appended claims, can be obtained from the foregoing description and the drawings.

Having thus described the invention, what is claimed is:

1. Apparatus for declutching a gear selector on a vehicle comprising:
    means operably connected for moving said gear selector between a forward and a neutral position;
    a first link connected to said gear selector means, said first link including a first end having a retainer and a second end having a stop;
    a second link having a first end pivotally connected to said first link adjacent said stop and having a slide at a second end, said slide connected to said vehicle;
    means connected for moving said first and second links between a first position wherein said stop engages said first end of said second link and said gear selector means is in a forward mode, and a second position wherein said stop is out of engagement with said first end of said second link and said gear means is in a neutral mode; and
    resilient means for maintaining said links in said first position and for urging said links into said second position, said resilient means interconnecting said retainer and said slide.

2. The apparatus of claim 1 wherein said resilient means is connected to said retainer on one side of a pivotal connection between said first link and gear selector means.

3. The apparatus of claim 2 wherein said gear selector means includes a cam device operably connected to a gearbox, said cam device having a detented ramp and a roller.

4. The apparatus of claim 2 wherein said vehicle includes a frame portion having a slot formed therein, said slide movably mounted in said slot.

5. The apparatus of claim 2 wherein said gear selector means is operably connected to a feed roll mechanism on a forage harvester.

6. The apparatus of claim 4 wherein said slide is operably connected to a hand control lever on said vehicle, said lever connected for moving said gear selector means in response to said resilient means maintaining said second link engaged with said stop.

7. The apparatus of claim 2 wherein said means connected for moving said first and second links between said first and second positions is operably connected to a metal detecting apparatus.

* * * * *